March 7, 1939.  D. L. ARENBERG ET AL  2,149,756
MEASURING APPARATUS
Filed Nov. 13, 1937  2 Sheets-Sheet 1

Inventor
DAVID L. ARENBERG
PERCY M. ROOPE
By
Attorney

Inventor
DAVID L. ARENBERG
PERCY M. ROOPE
By
C. R. Parker
Attorney

Patented Mar. 7, 1939

2,149,756

UNITED STATES PATENT OFFICE 2,149,756

MEASURING APPARATUS

David L. Arenberg, Rochester, and Percy M. Roope, Worcester, Mass.

Application November 13, 1937, Serial No. 174,478

20 Claims. (Cl. 175—183)

This invention relates to measuring apparatus and more particularly to measuring apparatus of the Wheatstone bridge type.

A number of years ago there was developed a highly sensitive testing instrument commonly known as an "ultra-micrometer". For the purpose of measuring small displacements, such instrument utilizes the heterodyne beat note between two vacuum tube oscillators, caused by changing the frequency of one of the oscillators. Such heterodyne method has been the subject of various alterations and improvements which have removed several objectionable features of the apparatus, but the apparatus is still open to substantial objections. For example, due to inherent sensitivity, such forms of apparatus in the past have proved very unstable and extremely susceptible to extraneous influences so that their use has not been practicable. Accordingly the apparatus would have to be checked frequently to compensate for different variable conditions such as temperature changes, etc.

Accordingly, one of the objects of this invention is the provision of measuring apparatus of the general character referred to which is relatively insensitive to changes in external conditions.

A further object is the provision of measuring apparatus which is sensitive only to the thing being measured.

A further object is the provision of measuring apparatus having means for producing two synchronous oscillating forces and having the unknown influence one of the forces, the measurement being indicated in accordance with the relative change in the two forces.

A further object is the provision of measuring apparatus generally of the Wheatstone bridge type having two generators of oscillating current in the arms of the bridge producing normally synchronous current oscillations and capable of indicating measurement by the unbalancing of the bridge caused by having the unknown influence one of the generators.

A further object is the provision of measuring apparatus of the Wheatstone bridge type having vacuum tubes in different arms of the bridge producing normally synchronous current oscillations and capable of indicating the measurement desired by the unbalancing of the bridge by causing the unknown to influence the oscillations produced by one of the tubes.

A further object is the provision of measuring apparatus of the Wheatstone bridge type having separate sources of alternating current of variable amplitude and frequency in the arms of the bridge and capable of being balanced with the current in the arms of the bridge oscillating synchronously, and which is extremely sensitive to any changes of factors which would tend to affect the frequency of one of the sources.

A further object is the provision of measuring apparatus of the Wheatstone bridge type having generators of alternating current in the arms of the bridge, which is extremely sensitive when operated adjacent a point of balance at which the generators produce alternating current synchronously.

Other objects and advantages of the invention will become apparent during the course of the following description.

In the drawings we have shown several embodiments of the invention. In this showing:

Figure 4:
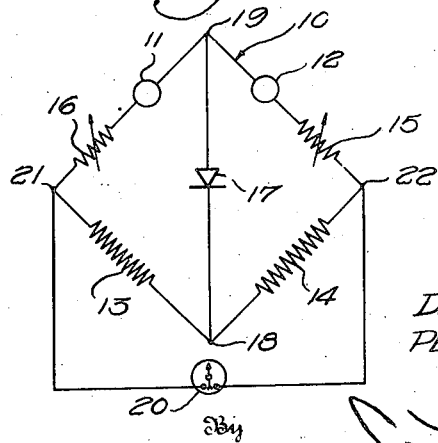
Figure 4 is a diagrammatic sketch of circuits and apparatus constructed and arranged so as to illustrate the principle of the invention.

An understanding of the principles of this invention will best be had by referring to the disclosure in Figure 4. In this showing the numeral 10 indicates a modified form of the Wheatstone bridge in separate arms of which are placed two generators 11 and 12 driven by a common source of energy (not shown) and capable of producing separately alternating forces, the frequencies and amplitudes of which can be varied at will.

The bridge is completed by the addition thereto of fixed loading devices 13 and 14 and of a type which is preferably free from influences of the character of the impressed force. Additional variable loading devices 15 and 16 may also be added to the bridge. The arms of the bridge are shunted by a suitable rectifier 17 which allows current to flow in only one direction between the points 18 and 19. A galvanometer 20 is provided which is capable of indicating the average difference in potential or energy between the points 21 and 22.

The bridge is balanced so that there will be no deflection of the galvanometer 20 when the generators 11 and 12 are operating at different frequencies. If the amplitudes of the oscillating currents are kept constant, no change in the balance will be indicated as the frequencies are slightly altered. However, it has been found that when the difference in frequencies of the generators is small they will lock and operate synchronously within certain limitations dependent upon the characteristics of the generators, and during such condition of synchronous operation correspondingly large deflections of the galvanometer will occur as any factor which would tend to alter the frequency of either generator is changed.

Because of the fact that both generators are not operating at their natural frequencies, their output will vary in a manner similar to that of a body undergoing forced resonance and follow a typical resonance response curve. The effects of the forced frequency will also be expressed by the occurrence of a phase difference between the generators. The one with the higher natural frequency will lead while the other will lag. Because of the action of the rectifier 17, these differences of amplitude and phase of the generators will cause the direction of flow through the galvanometer 20 to become polarized and more or less unidirectional.

The above results are due to the fact that whenever two non-linear generators of variable force have any interaction, they will always tend to synchronize or lock in frequency when their difference in frequency is small. This in part is due to the fact that it is impossible to build a perfect generator having linear characteristics which would prevent synchronization. For these reasons then the generators, although having a difference in natural frequency, will synchronize over a range dependent upon their degree of interaction and non-linearity.

Figure 2:
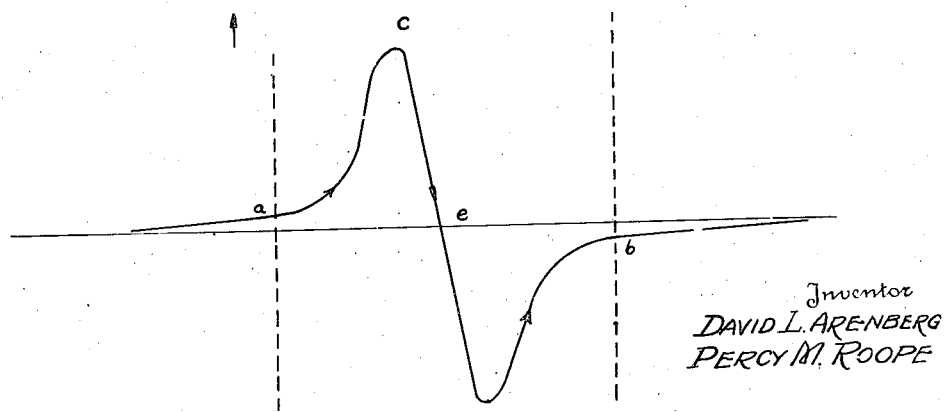
Figure 2 is a graph showing the response of the galvanometer for operation of the apparatus shown in Figure 1 under varying conditions.

Referring to Figure 2, a curve has been plotted which shows the typical response of the galvanometer as the generators are shifted through the synchronized region of operation. Outside the vertical lines passing through the points $a$ and $b$ the generators are operating at different frequencies and a change of the frequency of one of the generators will cause comparatively little deflection of the galvanometer 20. Within these lines the frequencies lock and as any factor which would normally change the frequency of one of the generators is altered, greater deflections of the galvanometer will occur. Assuming the generators to be running at different frequencies, there will be little change in galvanometer deflection until the point $a$ is reached, at which point the frequencies will lock. By the time the point $b$ is reached there will have been a shift in phase of 180° and at this point the generators will once more take up their separate frequencies.

On the portion of the curve between the points $a$ and $b$ there will appear two points $c$ and $d$ indicating the points at which the maximum flow of current takes place. Between these points the slope of the curve is very steep and substantially linear, the curve crossing the axis at point $e$. At the point $e$ the natural frequencies of the generators are equal and since neither generator influences the frequency of the other, the phase difference between the two generators at this point is zero. Between the points $c$ and $d$, it will be apparent that the arrangement will be extremely sensitive to any cause influencing unequally the frequency of either branch of the bridge. However, because of the bridge arrangement, forces affecting both generators equally will cause no change in the balance of the bridge.

Figure 1:
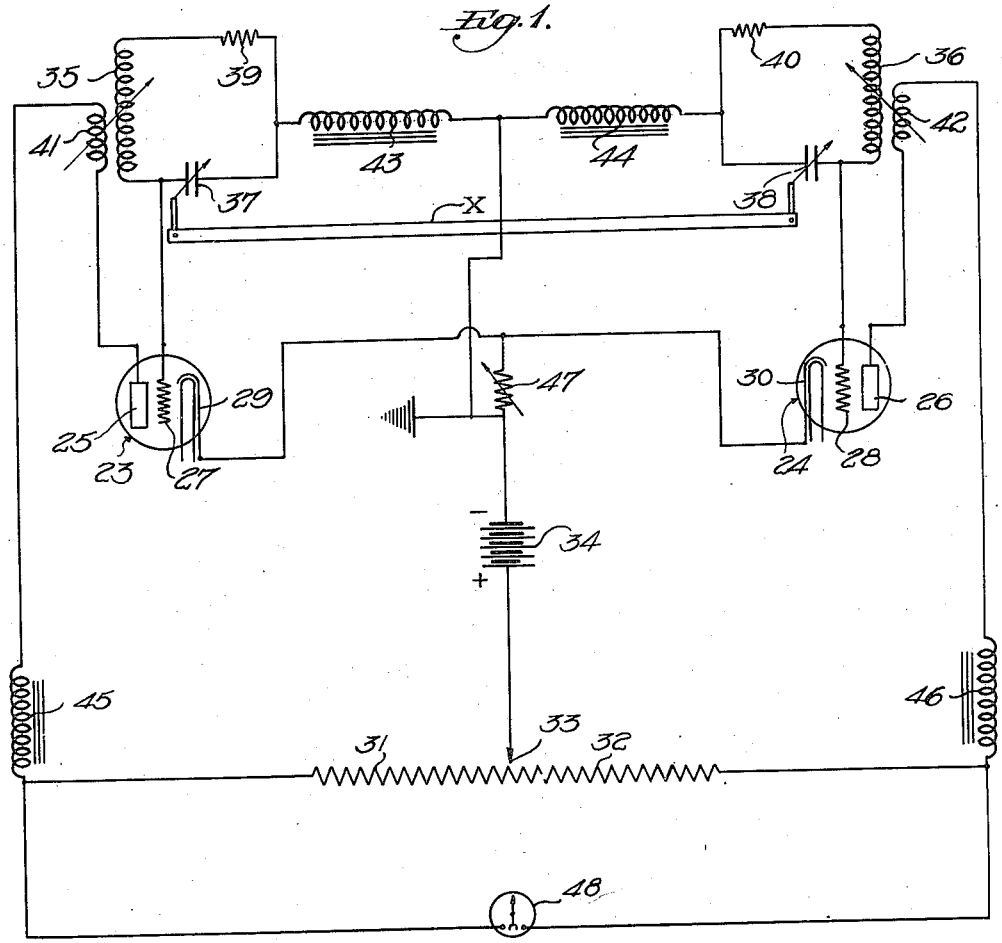
Figure 1 is a diagrammatic view of a preferred embodiment of our invention.

The above conditions of operation are met by the apparatus diagrammatically illustrated in Figure 1 constituting a preferred embodiment of our invention. In this showing two triode vacuum tubes 23 and 24 are placed in the arms of the bridge and respectively include plates 25 and 26, grids 27 and 28, and cathodes 29 and 30 having the usual heating elements. Variable resistances 31 and 32 are placed in the bridge, the values of which are shifted by the sliding contact 33 to assist in balancing the bridge. A source of potential 34 is provided which also serves to maintain a unidirectional flow of current similar to the rectifying device 17 in Figure 4.

In order that the vacuum tubes 23 and 24 may act as independent generators of oscillatory current they are connected with separate oscillatory circuits. As illustrated in Figure 1, the grid circuits are provided with inductance by means of the coils 35 and 36, and capacity by means of the variable condensers 37 and 38. The resistances 39 and 40 are kept as low as possible in order to keep the energy losses low and the amplitude large. A regenerative coupling is provided by inductively coupling tickler coils 41 and 42 with the coils 35 and 36. When the coils 41 and 42 are of the proper size with respect to the coils 35 and 36 respectively, sufficient energy will be fed back into the grid circuits and will cause the effective resistance thereof to become zero or negative. When the mutual inductance between the coils is high enough to produce this result, the tubes will act as generators of continuous alternating currents. The oscillatory circuits illustrated are of the tuned grid type and are self-excited. Obviously, any equivalent circuit capable of producing an oscillating current may be used.

A variable resistance 47 is provided to bias the grids and place them at a proper potential with respect to the filaments. In order to limit the interaction of the two generators, choke coils 43 and 44 are connected in the grid leads and for the same purpose choke coils 45 and 46 are placed in the plate leads. A suitable galvanometer 48 is connected across the bridge.

The apparatus illustrated in Figure 1 is set in operation by heating the cathodes 29 and 30 so that the tubes may pass current when a potential is applied from the source 34. The variable resistance 47 is then adjusted to secure the optimum grid bias for the tubes 23 and 24. The tickler coils 41 and 42 are then adjusted to enable the tubes to generate oscillating currents. With the tubes operating at different frequencies, the potentiometer contact 33 is shifted until a balance of the bridge is indicated by a zero reading of the galvanometer 48.

After having secured a balance of the bridge in the above fashion, the condensers 37 and 38 are adjusted until synchronization is reached. This region will be indicated by extreme sensitivity of the galvanometer 48 to further changes in capacity. As synchronization is approached the galvanometer deflection will follow a curve similar to that illustrated in Figure 2. After the synchronous region is reached, further adjustments to the condensers 37 and 38 are made until a balance of the bridge is indicated by the galvanometer 48 with the generators or tubes 23 and 24 operating synchronously.

The tubes and their associated oscillatory circuits act as complex impedances in the two arms of the Wheatstone bridge and in the region of synchronization the value of their impedances and the amplitude of the oscillatory current in each grid circuit will vary greatly as those factors which would normally tend to change the frequency produced thereby are changed. The A. C. component of the current and voltages in the right and left oscillators in general will follow a curve of the resonance response type as shown in Figure 2 while the frequencies are being shifted. The D. C. component of the current and voltage in all parts will in general remain constant. However, because of the detecting action of the tubes, a pulsating direct current is obtained from the A. C. component and added to the normal D. C. current. This causes a deflection of the galvanometer dependent upon the difference in the average amplitude of the tubes. Since the amount of direct current which will pass from plate to cathode is representative of the average value of grid potential, the resistance or effective impedance of such tube and the resultant balance of the bridge will depend directly upon the degree of synchronization. With synchronous operation the galvanometer reading can therefore be made to indicate the amount of change in the tuning circuit. Accordingly, after having secured a balance of the bridge with the tubes 23 and 24 operating synchronously, measurements may be taken by having the thing to be measured disturb the balance of the bridge. The galvanometer 48 may be suitably calibrated to translate the change in balance into proper terms.

In Figure 1 of the drawings one manner of affecting the bridge has been shown whereby measurements may be made of mechanical variations such as the deflection of a weighing scale, expansion and contraction under varying heat conditions, etc. The reference character X indicates the element whose variation is to be measured. This element may be connected to the movable plates of one or both of the condensers 37 and 38 to vary the distance between the movable and fixed condenser plates. The galvanometer 48 may be calibrated by plotting a series of galvanometer deflections against different separations of the plates of the condensers 37 and 38. By selecting the straightest portion of the resonance curve between the points $c$ and $d$ as shown in Figure 4, a direct reading instrument may be had.

The same general method may be followed where the inductance of the coils 35 and 36 is caused to influence the balance of the bridge rather than the capacity of the condensers 37 and 38 as outlined above. Obviously, innumerable other ways may be employed for causing elements in the bridge to influence the frequency of the circuits and to indicate measurements in suitable terms or determine physical properties of various substances in accordance with the resultant change in balance.

Due to the bridge arrangement of the parts of the apparatus, any external condition which would affect the natural frequency of one of the oscillatory circuits will likewise affect the frequency of the other oscillatory circuit an equal amount. Accordingly, where a very high degree of stability is required, both circuits should be kept as alike as possible with respect to wiring and parts in order to maintain freedom from external conditions and undesirable stray currents. One of the advantages of this arrangement is that the apparatus, once it has been balanced and adjusted for operation, will maintain the balance after considerable use without need of rechecking or recalibrating the hook-up. The unknown need only be inserted in a predetermined manner into the circuit and the measurement taken by noting the galvanometer deflection. Due to the freedom from external forces, only the change in balance caused by the unknown will be indicated.

Figure 3:
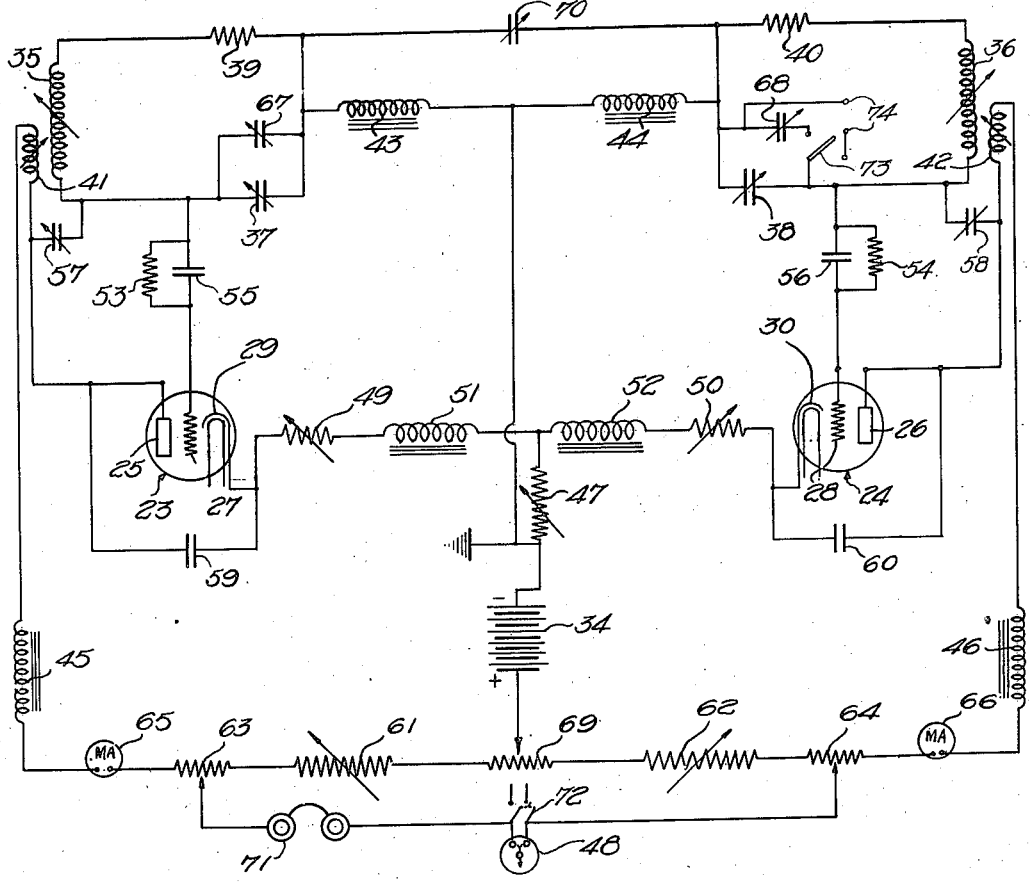
Figure 3 is a diagrammatic view of a modification of the invention.

As illustrated in Figure 3, additions may be made to the apparatus in order to secure greater accuracy and control of the instrument. In this showing, 49 and 50 are additional grid biases to enable the characteristics of the tubes to be more evenly matched and 51 and 52 are additional choke coils for the purpose of additionally limiting the interaction of the generators 23 and 24 respectively. To allow for more efficient oscillation, grid leak resistances 53 and 54 are placed in parallel with the grid condensers 55 and 56 in the grid circuits of the tubes 23 and 24 respectively. Small variable condensers 57 and 58 may be used to help adjust the feed back of the tickler coils 41 and 42. By-pass condensers 59 and 60 are connected across the plate and filament circuits as shown in order that the oscillatory currents may be taken from plate to filament without traversing the arms of the bridge, thus leaving only the D. C. component of the plate current to act. In this modification, the mutually variable resistances 31 and 32 shown in Figure 1 are replaced by independently variable resistances 61 and 62. The galvanometer 48 is adjustably connected across small resistances 63 and 64 to enable it to be balanced without disturbing the plate currents of the tubes. Milliammeters 65 and 66 are placed in the bridge to indicate the amount of D. C. plate current being drawn. A small variable resistance 69 is provided for making very fine adjustments in the balance of the bridge. Small condensers 67 and 68 may be placed in parallel with condensers 37 and 38 to aid in making fine adjustments in the phase angle.

The oscillatory circuits in the two branches of the bridge are never entirely separate and three types of coupling may occur. These are the resistance coupling due to a common source of potential, inductive coupling between the various coils, and capacity coupling between the various conductors. In Figure 3, a condenser 70 is provided for varying the coupling between the oscillators. This can be accomplished by the use of a coil or in any other suitable manner.

As pointed out above, the synchronous region of operation will be indicated by increased sensitivity of the galvanometer 48 to further changes in the setting of the apparatus. However, to facilitate securing a balance of the bridge with the generators operating synchronously, a pair of ear phones 71 is placed in series with the galvanometer 48. With a variance of frequency in the oscillating currents, a heterodyne beat note will be heard. The beat note will drop in pitch as synchronization is approached and will be entirely absent in that region. The galvanometer 48 may then be used to balance the bridge with the generator operating synchronously. After having secured this balance, the instrument may be connected to operate a suitable indicating instrument other than the galvanometer 48. A switch 72 is provided to enable this connection to be made.

The operation of the apparatus illustrated in Figure 3 is essentially the same as that described for the apparatus in Figure 1. However, to secure proper results the grid biases 47, 49 and 50, and the plate resistances 61 and 62 should be adjusted until the ammeters 65 and 66 show that the tubes 23 and 24 are drawing the same current. The coupling condensers 57 and 58, and inductances 41 and 42 should be separately adjusted to secure the maximum amplitude of oscillation in the tubes. These adjustments are made to allow for individual differences in the A. C. and D. C. characteristics of the tubes. The oscillators which have been operating at different frequencies are synchronized by shifting the plates of the condensers 37 and 38. A balance of the bridge, after synchronous operation of the tubes has been effected, indicated by a zero galvanometer reading, is then preferably secured by an adjustment of the small condensers 67 and 68. In order to secure the optimum coupling value, it may be necessary to take a series of calibration curves for different settings of the condenser 70.

A change in the sensitivity of the instrument may be made without recalibration by use of the condensers 67 or 68. If these condensers are made up of flat parallel plates and the total capacity of the pairs 67—37 and 68—38 is fixed, the sensitivity constant will be found to vary inversely as the square of the distance between the plates. The instrument may be calibrated with a condenser 67 of small capacity and the plates far apart in order to secure an accurate measurement. From the slope of the resonance response curve, the sensitivity may be calibrated when the condenser 37 is used as a variable with the plates close together.

The absolute value of the shift in other types of impedance besides capacity may be determined by applying known electrical formulae for the relation between impedance and frequency. In measuring small impedances such as the interelectrode capacity of a vacuum tube, the impedance may be placed directly in the circuit in place of either condenser 67 or 68 and be evaluated from the galvanometer deflection and sensitivity constant. For example, a shunt has been shown as being connected around the condenser 68 and controlled by a switch 73. The article or device to be tested may be connected across the binding posts 74 of the shunt circuit referred to.

Innumerable ways of operating the apparatus may be devised depending upon the type of measurement to be taken or the material to be tested and the accuracy desired. Actual use has shown the apparatus to have extreme sensitivity when operated about the point of balance with the tubes generating current synchronously. Actual tests have indicated the apparatus to be capable of measuring displacements of $1 \times 10^{-8}$ cm. and detecting differences in frequency of as small as one part in five million. Furthermore, external conditions such as temperature and pressure have little effect on the results where the arrangement of the parts in both branches of the bridge are kept as nearly alike as possible.

It is to be understood that the forms of the invention herein shown and described are to be taken as preferred examples of the same and that various changes may be made therein without departing from the spirit of the invention or the scope of the subjoined claims.

We claim:

1. Apparatus of the character described comprising a Wheatstone bridge, circuits connected thereto for separately producing alternating currents of variable frequency and amplitude in separate branches respectively of said bridge, means for synchronizing the frequencies in said branches, and means indicating a change in balance of the bridge caused by variations in the electrical condition in one branch of said bridge.

2. Apparatus of the character described comprising a Wheatstone bridge, a separate source of alternating current of variable frequency and amplitude in each branch of said bridge, means for synchronizing the frequencies in said branches, and means indicating a change in balance of said bridge caused by the introduction of an unknown quantity into a branch of said bridge.

3. Apparatus of the character described comprising a Wheatstone bridge, a vacuum-tube oscillator in each branch of said bridge, means for synchronizing the frequency of the currents generated by said tubes, and means indicating a change in balance of said bridge caused by the introduction of an unknown quantity into a branch of said bridge.

4. In apparatus of the character described having a bridge arrangement of circuits producing a separate oscillating force of variable frequency and amplitude in each branch of the bridge, means for balancing said bridge with said circuits producing such forces synchronously, and means indicating a change in balance of said bridge caused by the introduction of an unknown quantity into a branch of said bridge.

5. Apparatus of the character described comprising a Wheatstone bridge, means for producing a separate oscillating force in each branch of the bridge, means for synchronizing said forces, means for securing a balance of said bridge with said forces oscillating synchronously, and means indicating a change in balance of the bridge caused by the introduction of an unknown quantity into a branch of said bridge.

6. Apparatus of the character described comprising a Wheatstone bridge, a separate source of alternating current in each branch of the bridge, means for varying the frequency and amplitude of the current in said branches, means for securing synchronous oscillations of the current in said branches, means for securing a balance of the bridge with the current in the branches thereof oscillating synchronously, and means indicating a change in balance of the bridge caused by the introduction of an unknown quantity into a branch of said bridge.

7. Apparatus of the character described comprising a Wheatstone bridge, a vacuum-tube oscillator in each branch of said bridge, means for securing a balance of said bridge with said vacuum-tube oscillators operating synchronously, and means indicating a change in balance of said bridge caused by the introduction of an unknown quantity into a branch of said bridge.

8. Apparatus of the character described comprising a Wheatstone bridge, a vacuum-tube oscillating circuit in each branch of said bridge, means for tuning said circuits to produce synchronous oscillations of current therein, means for securing a balance of said bridge with said tubes operating synchronously, and a suitably calibrated electrical instrument connected across the bridge for indicating a change in balance.

9. Apparatus of the character described comprising a Wheatstone bridge, a vacuum-tube oscillator in each branch of said bridge, means for securing a unidirectional flow of current connected in parallel with said branches, means for securing a balance of said bridge with said vacuum-tube oscillators operating synchronously, and means indicating a change in balance of said bridge caused by the introduction of an unknown quantity into a branch of said bridge.

10. Apparatus of the character described comprising a Wheatstone bridge, a vacuum-tube oscillatory circuit in each branch of said bridge, means for securing a unidirectional flow of current connected in parallel with the branches of said bridge, means for tuning said oscillatory circuits to produce synchronous oscillations of current therein, means for securing a balance of said bridge with said tubes operating synchronously, and a suitably calibrated electrical instrument connected across said bridge for indicating the change in balance.

11. In testing apparatus of the Wheatstone bridge type, means for securing extreme sensitivity of a bridge when operated about a point of balance, comprising means for producing an oscillating force of variable amplitude and frequency in each branch of said bridge, means for synchronizing said forces, means for balancing said bridge with said forces oscillating synchronously, and means indicating a change in balance of said bridge caused by any factor influencing unequally either branch of said bridge.

12. In testing apparatus of the Wheatstone bridge type, means for securing extreme sensitivity of the bridge when operated about a point of balance comprising a vacuum-tube oscillating circuit in each branch of said bridge, means for tuning said circuits to produce synchronous oscillations in each branch of the bridge, means for balancing said bridge with said circuits operating synchronously, and means indicating a change in balance of said bridge caused by any factor influencing unequally either branch of said bridge.

13. In testing apparatus of the Wheatstone bridge type, means for securing extreme sensitivity of the bridge when operated about a point of balance comprising a vacuum-tube oscillator in each branch of said bridge, means for securing a unidirectional flow of current connected in parallel with said branches, means for securing a balance of said bridge with said vacuum-tube oscillators operating synchronously, and means indicating a change in balance of said bridge caused by any factor influencing unequally either branch of said bridge.

14. In testing apparatus of the Wheatstone bridge type, means for securing extreme sensitivity of the bridge when operated about a point of balance comprising a vacuum-tube oscillator in each branch of said bridge, means for balancing said bridge with said oscillators operating synchronously, and means indicating the change in balance of said bridge caused by any factor influencing unequally either branch of said bridge.

15. Apparatus of the character described comprising a Wheatstone bridge, a vacuum-tube oscillator in each branch of said bridge, means limiting the interaction of said vacuum-tube oscillators, means for securing a balance of said bridge with said vacuum tube oscillators operating synchronously, and means indicating a change in balance of said bridge caused by variations in the electrical condition in one of the branches of said bridge.

16. Apparatus of the character described comprising a Wheatstone bridge, a vacuum-tube oscillating circuit in each branch of said bridge, means limiting the interaction of said circuits, means for tuning said circuits to produce synchronous oscillations of current therein, means for securing a balance of said bridge with said tubes operating synchronously, and an electrical instrument connected across the bridge for indicating a change in balance.

17. In testing apparatus of the Wheatstone bridge type, means for securing extreme sensitivity of the bridge when operated about a point of balance comprising a vacuum-tube oscillator in each branch of said bridge, means limiting the interaction of said vacuum-tube oscillators, means for balancing said bridge with said oscillators operating synchronously, and means indicating a change in balance of said bridge caused by any factor influencing unequally either branch of said bridge.

18. Apparatus of the character described comprising a Wheatstone bridge, circuits connected thereto for separately producing alternating currents of variable frequency and amplitude in the respective branches of said bridge, means substantially confining said currents to the respective branches in which they appear, means for balancing said bridge with said circuits operating synchronously, and means indicating the change in balance of said bridge caused by any factor influencing unequally either branch of said bridge.

19. In apparatus of the character described having a bridge arrangement of circuits producing a separate oscillating force of variable frequency and amplitude in each branch of the bridge, means substantially confining said forces to the respective branches in which they appear, means for balancing said bridge with said circuits producing such forces synchronously, and means indicating a change in balance of said bridge caused by any factor influencing unequally either branch of said bridge.

20. Apparatus of the character described comprising a Wheatstone bridge having a separate alternating current present in each branch thereof, means confining said currents to the respective branches in which they appear, means for varying the frequency and amplitude of said currents, means for securing a balance of said bridge with the frequencies of the currents in said branches equal, and means indicating a change in balance of said bridge caused by any factor influencing unequally either branch of said bridge.

DAVID L. ARENBERG.
PERCY M. ROOPE.